June 7, 1966 W. B. WILKINS 3,255,062
METHOD OF MANUFACTURING A REINFORCED HONEYCOMB STRUCTURE
Filed Feb. 19, 1963
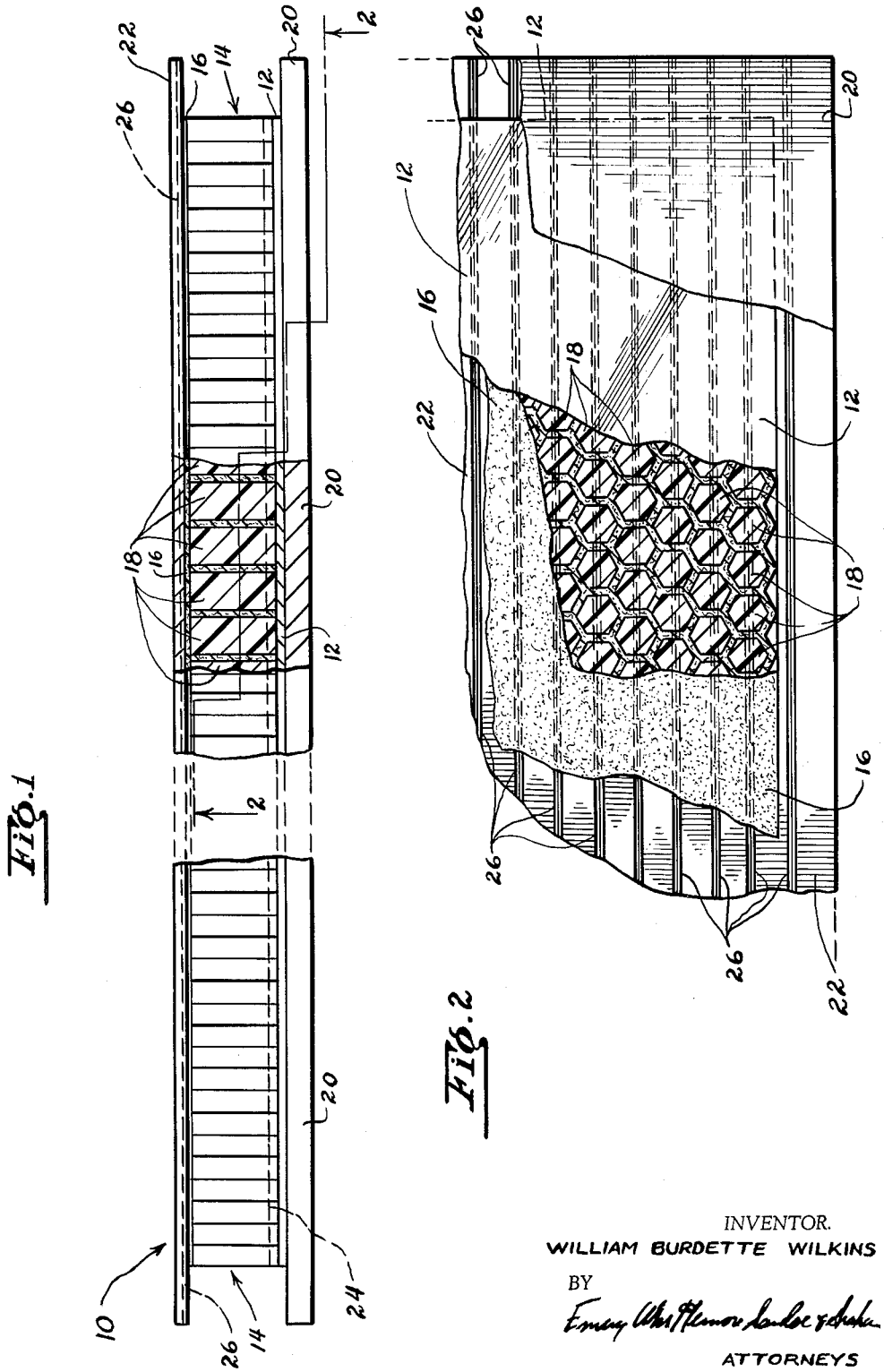
INVENTOR.
WILLIAM BURDETTE WILKINS
BY
ATTORNEYS

United States Patent Office 3,255,062
Patented June 7, 1966

3,255,062
METHOD OF MANUFACTURING A REINFORCED HONEYCOMB STRUCTURE
William Burdette Wilkins, Roxboro, N.C., assignor to Reinforced Plastic Container Corporation, Roxboro, N.C., a corporation of North Carolina
Filed Feb. 19, 1963, Ser. No. 259,569
1 Claim. (Cl. 156—79)

This invention relates to an improved composite structure and, more particularly, relates to an improved structure, such as a flooring structure, which is subjected to heavy surface loading and to an improved method for manufacturing such structures.

In many applications, such as shipping containers and the like, the economics of transportation have resulted in emphasis on increasing the strength-to-weight ratio of elements used in such structures.

The use of honeycombs, or lattice shaped structures formed of open ended cells joined in a regular pattern, as a reinforcement for skins bonded to the honeycomb is, of course, known to the art. In such structures as, for example, wing structures for aircraft, the honeycomb supports the skin and provides the beam strength desired for such applications with a structure of relatively low weight.

However, when such structures are subjected to loads applied to the face plates or skins thereof, the structure is subject to failure due to buckling of the honeycomb cells under such loading. For this reason, a composite structure of this nature has not been employable for use as floor structures which are required to carry heavy loads.

In many applications as, for example, in the construction of shipping containers having dimensions of 40 x 8 x 8 feet, it is desirable that the container itself weigh as little as possible thereby to reduce tare weight. The use of a composite structure, having honeycomb reinforcement, would, of course, be advantageous for the floor of such containers due to the relatively high beam loading sustainable by such structures at a relatively low weight. However, to date, such composite structures could not be employed as floor members since they were unable to carry the heavy stresses applied during loading of the container as, for example, by forklift trucks and were unable to sustain the floor loading of a loaded container.

It is, therefore, one object of this invention to provide an improved composite structure utilizing a honeycomb reinforcement which can sustain high face loads.

It is a further object of this invention to provide an improved method for fabrication of such composite structures.

In accordance with these objects, there is provided in a preferred embodiment of this invention, an improved composite structure comprising a face plate such as a thin, sheet-steel face plate. A honeycomb is positioned in contact with the face plate. The honeycomb cells are filled with and the honeycomb is bonded to the face plate by foamed, low-density, rigid plastic, in each cell. On the side of the honeycomb opposite to the face plate, a paper sheet is provided.

In accordance with the method of this invention, a thin sheet of steel plate is laid on the lower platen of a mold. A thin layer of foamable plastic in liquid form is spread evenly on the plate. A honeycomb is pressed down on the plate, automatically subdividing the liquid into small quantities within each cell of the honeycomb. A porous sheet is laid over the top of the honeycomb. The upper platen of the mold is then closed on the composite structure and the plastic actuated so as to foam. The mold holds the assembly under pressure so that, as the foam fills the volume of each cell, it will simultaneously bond the honeycomb to the face plate. To enable escape of air and gas from the cell during expansion of the foam, the upper mold or platen is provided with a plurality of vents in the surface thereof. Thus, the foam can fill each cell of the honeycomb. The foam is stopped at the porous sheet to define the surface without additional manufacturing steps.

Having briefly described this invention, it will be described in greater detail along with other objects and advantages in the following accompanying drawings, of which:

FIG. 1 is a partially sectioned elevation view of the composite structure within the fabricating mold useful in explaining both the structure and the method of manufacture of such structures; and FIG. 2 is a sectional view partially broken away taken along lines 2—2 of FIG. 1.

In the figures, there is shown a composite structure 10 comprising a face plate 12, a honeycomb structure 14 and a porous sheet member 16. Each cell 18 of the honeycomb 14 is filled with a low-density, rigid foamed plastic which extends in contact with and serves to bond the honeycomb to both the face plate 12 and sheet 16.

The structure is suitable for such applications as a floor for shipping containers of relatively large dimensions such as 40 x 8 x 8 feet. The honeycomb is preferably formed of cardboard or laminated paper stock assembled into a honeycomb formation in conventional fashion. Alternatively, honeycombs formed of thin sheet metal may be employed. The cells of the honeycomb may be conventional hexagonal cells three-eighths in. to one-half in. across. The honeycomb thickness is, however, preferably three in. thick to provide the beam strength necessary to support the contents of fully loaded containers.

The honeycomb, when bonded to the face plate 12, will provide the requisite beam strength without further preparation. However, under high floor loading on the plate face 12, the columns defined by each honeycomb cell will buckle, resulting in failure of the structure. I have found, however, that, by filling each cell with a rigid foam of low density, the buckling resistance of the cell columns can be substantially increased so that a relatively thin face plate, of for example, sheet steel formed of two layers of steel, each layer being 0.031-in. in thickness can sustain the weight of a fully loaded forklift truck.

The rigid foam may take various forms of commercially available foamed plastic. For example, the foam may be made as a reaction product of an isocyanate, polyisocyanate, polyisocyanite with polyether, polyester, or polyglycol resins.

One of the formulations used is composed of the following: polyether glycol, fluorocarbon, silicone oil, amine catalyst, polyisocyanate or isocyanates.

In order to fill each of the cells with the foamed plastic so that each cell will have the requisite resistance to buckling under loads, will provide the requisite bond between the components of the composite structure, and will have the desired configuration with the foam completely filling each cell without overflow, the structure is assembled according to the method of this invention, as follows:

The face plate 12 is placed on the lower platen 20 of the mold. A thin layer of foamable plastic in liquid form is then spread evenly on the plate. The honeycomb 14 is then positioned over the liquid and pressed down into contact with the plate 12. As the honeycomb is positioned, each cell will automatically be filled with the desired level of foamable plastic as indicated by the dashed line 24. A porous sheet 16 is laid over the top of the honeycomb and the upper platen 22 of the mold closed on the composite structure. The foamable plastic is activated by heat or catalyst, depending on its characteristics, to foam up into the cells of the honeycomb.

In order to allow the foam to completely fill each cell of the honeycomb, the top platen is provided with a plurality of spaced apart V-shaped vent slots 26 spaced in the surface thereof. For example, with half inch honeycomb cells, the slots will be spaced apart by a quarter to three-eighths of an inch to ensure that each cell has access to one vent. Each vent is approximately 0.025 in. deep and 0.025 in. wide at the surface.

As the plastic foams, the gas and air enclosed within the cell will pass through the porous sheet 16 and will be vented to the atmosphere by the respective vents 26. However, as the foam reaches the sheet 16, its volume will be defined thereby since the foam will not penetrate or pass through the sheet. This sheet may, for example, be porous filter paper. In addition, kraft paper 4 mills in thickness has been found to have sufficient porosity to properly vent each cell. The narrow slots will support the paper to define the surface of the composite structure. The small vents are adequate for venting, and will not be clogged by the foam since the paper will stop the foam from entering the vents.

By this method of assembly, each cell can be completely filled with foam to provide the requisite support to the cell column and at the same time be placed in interim contact with the face plate to serve as the bonding agent between the honeycomb and the face plate. It is, of course, mandatory that the vents be provided. Without the venting, the cells would not be filled with the foamed material and, thus, the requisite strength could not be obtained.

This invention may be variously modified and embodied within the scope of the subjoined claim.

What is claimed is:

The method of making a composite structure which comprises the steps of placing a thin face plate on the lower platen of a mold, spreading a thin layer of foamable plastic in liquid form on said plate, placing a honeycomb an said liquid and pressing said honeycomb through the liquid into contact with the face plate thereby to charge each cell of said honeycomb with a predetermined quantity of foamable plastic, placing a porous paper on top of said honeycomb, lowering the top platen of said mold into pressure engagement with said structure, said top platen being provided with a plurality of slots scored in the surface engaging said structure, activating the plastic to expand in a foam, supporting said porous paper by said top platen to prevent displacement of said paper during foaming, said paper serving as a venting means during foaming and adapted to pass the air entrapped in each honeycomb and the gases created by the expanding foam therethrough to permit the foam to expand to the top of each honeycomb cell unimpeded by the buildup of gas pressure, said paper being adapted to be substantially impermeable to the passage of foam to stop foam expansion at said paper with each honeycomb cell filled by said plastic foam, and continuously passing the air and gas vented from each cell through said paper to the atmosphere, said passing of air and gas from each cell to the atmosphere being performed by said plurality of slots scored in the surface of the top platen to pass the gases and air vented through the paper from each cell to the atmosphere while simultaneously providing support for said paper against displacement upwardly into said slots by the pressure imposed by expansion of said foam.

References Cited by the Examiner

UNITED STATES PATENTS

| | | | |
|---|---|---|---|
| 1,234,160 | 7/1917 | Hargrave et al. | 264—86 |
| 2,311,358 | 2/1943 | Baily | 264—86 X |
| 2,744,042 | 5/1956 | Pace. | |
| 2,870,857 | 1/1959 | Goldstein | 154—45.9 |
| 2,911,076 | 11/1959 | Saunders et al. | 154—45.9 |

FOREIGN PATENTS 213,242   7/1957   Australia.

ALEXANDER WYMAN, *Primary Examiner.*

MORRIS SUSSMAN, EARL M. BERGERT, *Examiners.*